United States Patent
Meneau (10) Patent No.: US 9,734,120 B2
(45) Date of Patent: Aug. 15, 2017

(54) METHODS, DEVICES, AND SYSTEMS WHERE AN ACCESSORY CONTROLS POWER DELIVERY FROM A HOST DEVICE TO THE ACCESSORY THROUGH AN ACCESSORY PORT

(71) Applicant: Medtronic, Inc., Minneapolis, MN (US)

(72) Inventor: Phillip Meneau, Minneapolis, MN (US)

(73) Assignee: MEDTRONIC, INC., Minneapolis, MN (US)

( * ) Notice: Subject to any disclaimer, the term of this patent is extended or adjusted under 35 U.S.C. 154(b) by 2 days.

(21) Appl. No.: 14/799,335

(22) Filed: Jul. 14, 2015

(65) Prior Publication Data
US 2017/0017606 A1  Jan. 19, 2017

(51) Int. Cl.
*G06F 1/00* (2006.01)
*G06F 1/26* (2006.01)
(Continued)

(52) U.S. Cl.
CPC .......... *G06F 13/4282* (2013.01); *G06F 1/266* (2013.01); *G06F 1/325* (2013.01);
(Continued)

(58) Field of Classification Search
CPC .. G06F 1/3287; G06F 1/3293; G06F 13/4022; G06F 13/4282; H04W 4/008
(Continued)

(56) References Cited

U.S. PATENT DOCUMENTS 6,985,773 B2  1/2006  Von Arx
8,156,352 B2 *  4/2012  Ghosh ................... G06F 13/385
710/305

(Continued)

FOREIGN PATENT DOCUMENTS

EP      1857911 A1      11/2007
JP    2005295289 A      10/2005
JP    2012070415 A       4/2012

OTHER PUBLICATIONS

PCT Application No. PCT/US2016/030560 International Search Report and Written Opinion, Aug. 8, 2016.
(Continued)

*Primary Examiner* — Mark Connolly
(74) *Attorney, Agent, or Firm* — Withers & Keys, LLC (57) ABSTRACT

An accessory controls power delivery from a host device to the accessory by receiving and rectifying a wireless signal into an electrical voltage that operates an electronic switch. The electronic switch sets a voltage state of an electrical connection to the host device that triggers the host device to begin providing power. The accessory may no longer receive power from the host device once the wireless signal stops. The host device may be the source of the wireless signal and may thereby control whether the accessory draws power by operation of the wireless signal. Alternatively, the accessory may include a controller that once powered on by the host device as a result of the rectification of the wireless signal, maintains the same or a different electronic switch in a closed state to maintain power delivery from the host device until the controller is triggered to allow the electronic switch to open.

26 Claims, 9 Drawing Sheets

(51) Int. Cl.
*G06F 13/42* (2006.01)
*G06F 1/32* (2006.01)
*G06F 13/40* (2006.01)
*H04W 4/00* (2009.01)

(52) U.S. Cl.
CPC .......... *G06F 1/3287* (2013.01); *G06F 1/3293* (2013.01); *G06F 13/4022* (2013.01); *H04W 4/008* (2013.01)

(58) Field of Classification Search
USPC ........................................................ 713/300
See application file for complete search history.

(56) References Cited

U.S. PATENT DOCUMENTS

| | | | |
|---|---|---|---|
| 8,234,509 B2 | 7/2012 | Glosica | |
| 8,432,293 B2 | 4/2013 | Symons | |
| 8,688,037 B2 | 4/2014 | Chatterjee | |
| 2004/0137983 A1* | 7/2004 | Kerr | A63F 13/02 463/29 |
| 2004/0221183 A1* | 11/2004 | Lu | G06F 1/1626 713/300 |
| 2005/0039060 A1 | 2/2005 | Okayasu | |
| 2006/0223486 A1 | 10/2006 | Ruff et al. | |
| 2009/0193268 A1* | 7/2009 | Kreiner | G06F 1/266 713/300 |
| 2010/0218009 A1 | 8/2010 | Hoeksel et al. | |
| 2010/0253282 A1* | 10/2010 | Azancot | G06F 1/26 320/108 |
| 2011/0059694 A1 | 3/2011 | Audic | |
| 2011/0136550 A1 | 6/2011 | Maugars | |
| 2013/0007336 A1* | 1/2013 | Chun | G06F 1/266 710/316 |
| 2013/0254574 A1* | 9/2013 | Zacchio | G06F 1/3234 713/323 |
| 2014/0152425 A1 | 6/2014 | Valentine | |
| 2014/0180870 A1 | 6/2014 | Bombeck | |
| 2014/0266776 A1 | 9/2014 | Miller et al. | |
| 2014/0277286 A1 | 9/2014 | Cinbis | |
| 2014/0312834 A1 | 10/2014 | Tanabe et al. | |
| 2014/0313052 A1 | 10/2014 | Yarger et al. | |
| 2014/0358012 A1 | 12/2014 | Richards et al. | |
| 2015/0364943 A1* | 12/2015 | Vick | H02J 7/025 320/108 |
| 2016/0063485 A1* | 3/2016 | Tunnell | H02J 7/0042 705/41 |

OTHER PUBLICATIONS

Anon: "MC13883 Integrated Charger USB Interface—EXCERPTS", Freescale Semiconductor Technical Data, Feb. 1, 2010.

* cited by examiner

METHODS, DEVICES, AND SYSTEMS WHERE AN ACCESSORY CONTROLS POWER DELIVERY FROM A HOST DEVICE TO THE ACCESSORY THROUGH AN ACCESSORY PORT

TECHNICAL FIELD

Embodiments relate to delivering power from a host device to an accessory through an accessory port. More particularly, embodiments relate to an accessory controlling the delivery of power from a host device to the accessory.

BACKGROUND

Host devices such as smartphones, electronic tablets, and the like typically include one or more accessory ports. For instance, many host devices provide universal serial bus (USB) accessory ports. Host devices from Apple, Inc. include a proprietary accessory port known as the Lightning® port. Such accessory ports may have the ability to provide power from the host device to the accessory that is connected to the accessory port. In some cases, the accessory port may be able to utilize a single electrical connection to supply power and to receive power, and the accessory port is placed into one mode or the other by the accessory controlling a voltage state of a separate electrical connection. A USB port with an on-the-go feature set is one example.

While being able to power an accessory from the host device provides the advantage of no on-board battery for the accessory, there are also disadvantages. Conventionally, when an accessory is of the type that draws power from the accessory port of the host device, the accessory draws power the entire time it is connected to the accessory port of the host device. When the host device is battery powered, as is often the case since many host devices are of a portable nature, the accessory can excessively increase the rate of battery discharge of the host device. This is particularly troublesome for accessories that are intended to remain attached to the accessory port of the host device most of the time, as the amount of time that the host device may function on a single recharge of the battery may be reduced by an amount considered unacceptable by the user.

SUMMARY

Embodiments address issues such as these and others by providing an accessory that does not trigger the host device to provide power until the accessory receives and rectifies a wireless signal into power that can then close a switch to trigger the host device to begin providing power. The closing of the switch allows a voltage state of a connection at the accessory port to be set to a value that the host device recognizes as the trigger for providing power. The accessory may also have a controller that once powered from the host device begins to maintain the voltage state of the connection at the accessory port to thereby maintain the delivery of power to the accessory by the host device. The power delivery may be terminated in various ways, such as by ceasing the transmission of the wireless signal by the host device, by an application of the host device instructing the controller to cease maintaining the voltage state of the connection at the accessory port, by expiration of a timer, and so forth. In this manner, power is delivered to the accessory in a more limited manner to thereby preserve the amount of battery life remaining at the host device.

Embodiments provide a method of triggering a host device with an accessory port to provide power to an accessory coupled to the accessory port. The method involves receiving a wireless signal at the accessory while the accessory is not being powered by the host device and rectifying the wireless signal into a rectified signal at the accessory. The method further involves charging a power source of the accessory with the rectified signal and using power from the power source, manipulating by the accessory a voltage state of a first electrical connection at the accessory port to trigger the host device to begin providing power via a second electrical connection.

Embodiments provide a method of triggering a host device with an accessory port to provide power to an accessory coupled to the accessory port. The method involves providing a first electronic switch of the accessory in a first state such that the accessory is not being powered by the host device. The method further involves, upon the first electronic switch changing to a second state, manipulating by the accessory a voltage on a first electrical connection at the accessory port to trigger the host device to begin providing power via a second electrical connection.

Embodiments provide an accessory that triggers a host device with an accessory port to provide power to the accessory when coupled to the accessory port. The accessory includes an antenna that receives a wireless signal and a rectifier that rectifies the wireless signals into a rectified signal. The accessory further includes a power source that is charged by the rectified signal and a first electrical connection that controls whether the host device provides power to the accessory. Additionally, the accessory includes a triggering electrical connection and a first electronic switch coupled to the power source, to the first electrical connection, and to the triggering electrical connection. Upon the power source being charged and providing a voltage to the electronic switch, the electronic switch electrically interconnects the first electrical connection to the triggering electrical connection to trigger the host device to begin providing power to the accessory.

Embodiments provide a system that includes an electronic host device that includes an accessory port having a first electrical contact, a second electrical contact, and a triggering electrical contact. The system also includes an accessory where the accessory includes a plug having a first electrical connection, a second electrical connection, and a triggering electrical connection. The first electrical connection is electrically coupled to the first electrical contact, the second electrical connection is electrically coupled to the second electrical contact, and the triggering electrical connection is electrically coupled to the triggering electrical contact. The accessory also includes an antenna that receives a wireless signal, a rectifier that rectifies the wireless signals into a rectified signal, and a power source that is charged by the rectified signal. The accessory further includes a first electronic switch coupled to the power source, to the first electrical connection, and to the triggering electrical connection. Upon the power source being charged and providing a voltage to the electronic switch, the electronic switch electrically interconnects the first electrical connection to the triggering electrical connection to trigger the electronic host device to begin providing power to the accessory via the second electrical connection.

DETAILED DESCRIPTION

Embodiments allow for an accessory to be connected to an accessory port of a host device but not draw power from the host device until a wireless signal is received that allows a circuit of the accessory to trigger the host device to begin providing power. Thus, the battery of the host device is not perpetually being drained by the presence of the accessory. Additionally, embodiments allow for causing power delivery from the host device to the accessory to stop in one of various ways, such as by the termination of the wireless signal or by other methods so that the accessory may continue to function once the wireless signal has terminated.

Figure 1:
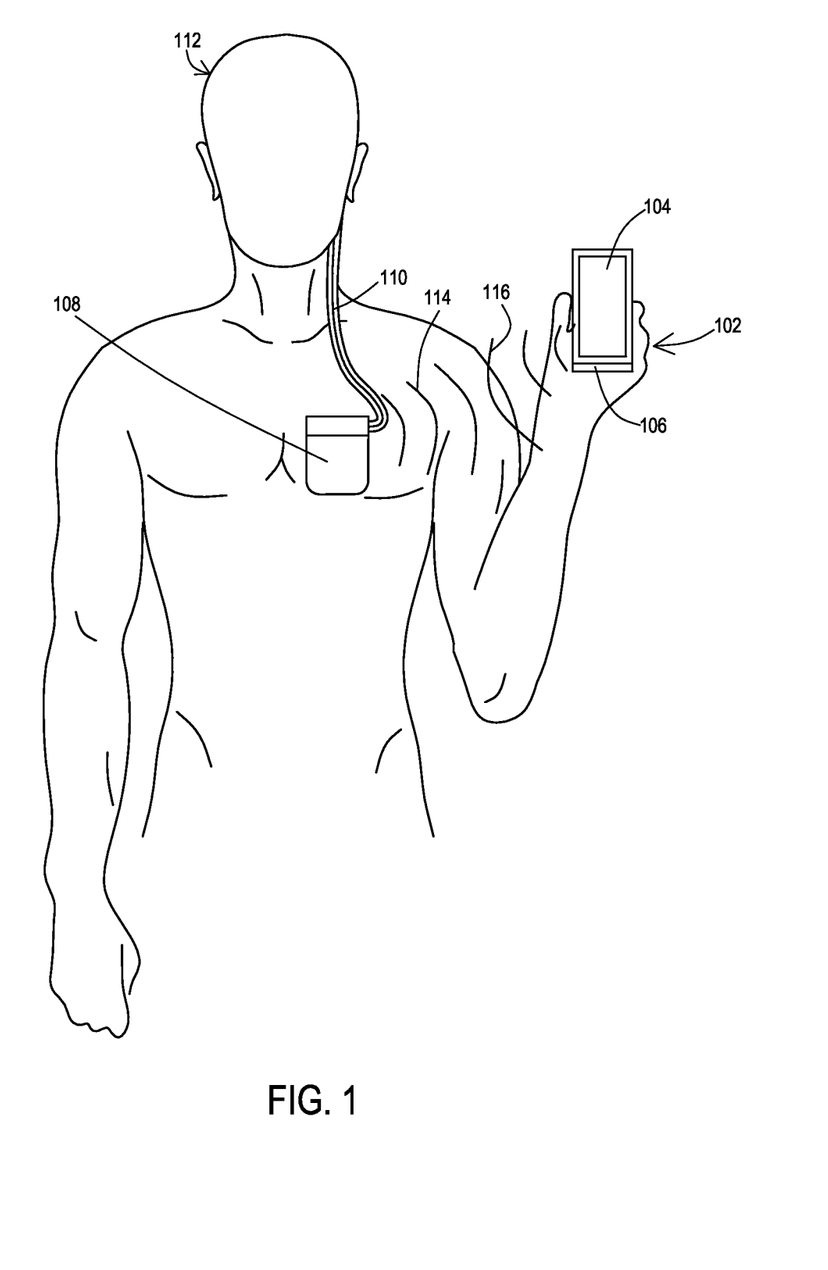
FIG. 1 shows one example of an environment where embodiments of a system including a host device and an accessory may be used.

FIG. 1 shows one example where a system 102 that includes an electronic host device 104 and an attached accessory 106 may be used. The electronic host device 104 may be of various forms such as a smartphone, other handheld electronic device, electronic tablet device, and the like. The accessory 106 may also be of various forms, such as a case to carry the host device 104, and provide one or more of a variety of functions. For instance, as shown in this example, the accessory 106 provides an ability to communicate wirelessly to receive wireless signals 114 from and/or transmit wireless signals 116 to an implantable medical device (IMD) 108 such as by telemetry, which may be inductive short-range telemetry, medium range telemetry, or a longer range telemetry and which may utilize any protocol known in the art. This particular example shows an IMD 108 that is connected to medical leads 110 to provide a neurostimulation therapy for the patient 112, but it will be appreciated that an IMD 108 that performs any function including neuro stimulation, cardiac pacing, delivery of a therapeutic agent via a pump, and the like may communicate with the accessory 106. It will be appreciated that the device communicating with the accessory 106 may not be implantable and may have other purposes besides providing medical therapy. Furthermore, it will be appreciated that the accessory 106 may provide functions other than communications with other devices. For instance, the accessory 106 may instead have on-board sensors for medical or non-medical purposes such as monitoring biological information or monitoring activity levels and the like.

In any event, the accessory 106 may perform functions in conjunction with the host device 104 or may perform functions independently of the host device 104. For instance, the host device 104 may implement an application program that may communicate with the accessory 106 to cause the accessory 106 to interrogate the IMD 108 or perform some other function and then relay information, such as information received from the IMD 108, to the application program of the host device 104. In another example, the accessory 106 may draw power from the host device 104 but may operate autonomously and may interrogate the IMD 108 or perform some other function and then internally utilize the received information without communicating with the host device 104.

Figure 2A:
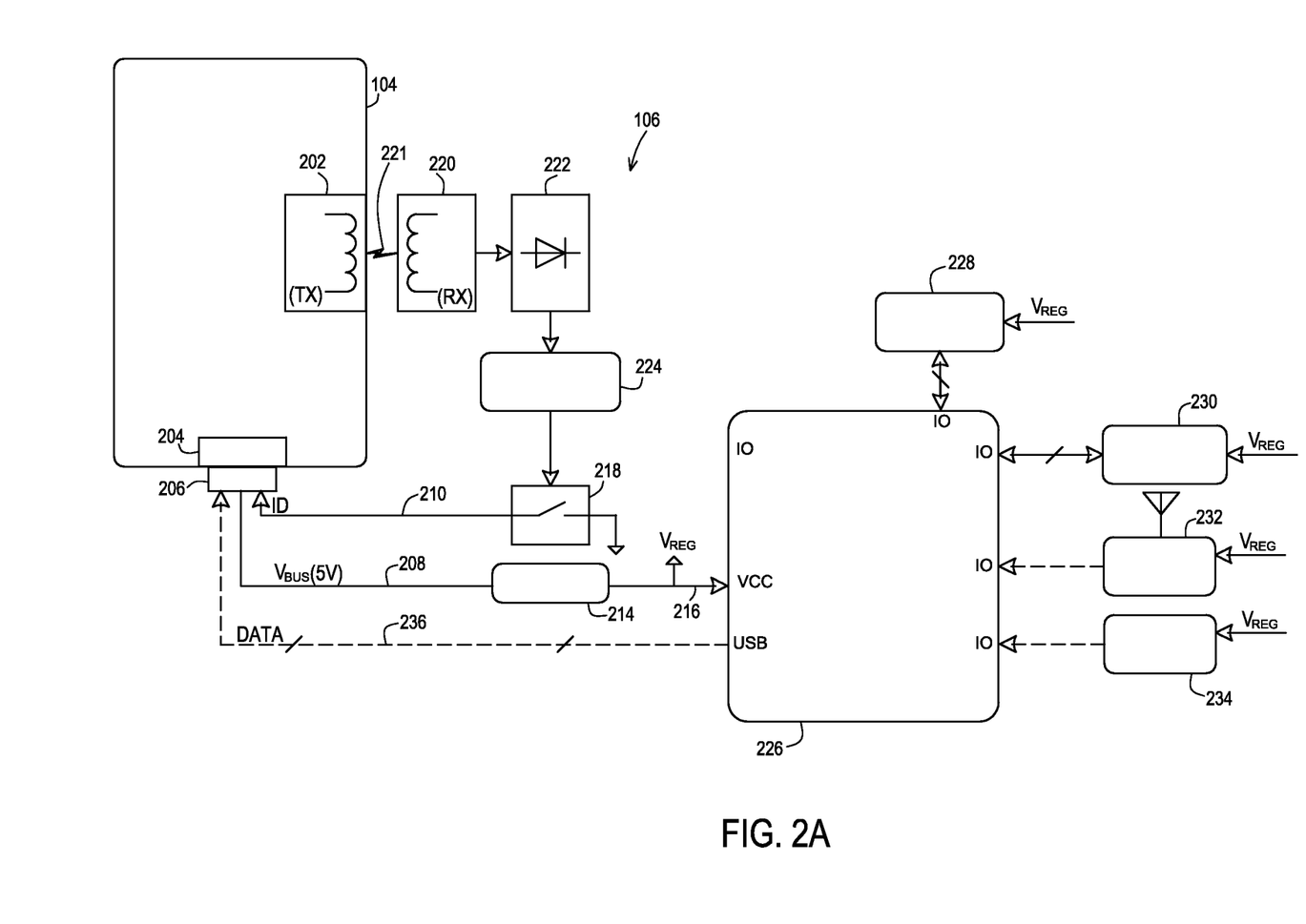
FIG. 2A shows an example of a system including a host device and an accessory that includes various components shown in block diagram form, where the accessory relies solely on received wireless signals to maintain the provisioning of power by the host device to the accessory.

In order for the accessory 106 to remain connected to the host device 104 but not require an on-board battery and not continuously draw power from the host device 104, the accessory 106 includes circuitry to receive wireless signals and then harvest power from those wireless signals in order to manipulate a voltage state present on a connection at the accessory port of the host device 104 that triggers the host device 104 to begin providing power to the accessory 106. FIG. 2A shows an example of the system 102 where components of the accessory 106 are shown in conjunction with a connection to the host device 104.

The host device 104 includes an accessory port 204 such as a micro-USB on-the-go port. The accessory 106 has a plug 206 that mates to the accessory port 204 to establish electrical connectivity between electrical contacts of the port 204 and corresponding electrical connections of the plug 206. The electrical connections of the plug 206 include a DC voltage supply connection 208 and an ID connection 210. The voltage supply connection 208 receives DC voltage from the corresponding electrical contact of the accessory port 204 upon the accessory 106 establishing a voltage state on the ID connection 210 that triggers the host device 104 to begin providing power. The port 204 also provides a triggering contact for the triggering connection of the plug 206 and the accessory 106.

While the trigger contact and triggering connection may be used to provide any voltage that is necessary to trigger the host device 104 to begin providing power to the accessory 106, the trigger contact may be a ground contact particularly where the host port 204 utilizes the USB protocol where the ID connection 210 may be grounded in order to initiate power from the host device 104. This triggering contact of the host port 204 is referred to herein as the ground contact while the triggering connection of the plug 206 is referred to herein as a ground electrical connection, but it will be appreciated that a voltage state other than ground may be used as may be appropriate. It will be further appreciated that a non-ground voltage state may be provided by supplying voltage to the ID connection 210 from the accessory 106 or by utilizing a voltage divider where a particular resistance is inserted by the accessory 106 between the ID connection 210 and ground.

The ground contact between the port 204 and the ground connection of the plug 206 is described in more detail below with reference to FIG. 2B. As also described in more detail below with reference to FIG. 2B, where the accessory port 204 is a USB on-the-go port, the voltage state of the ID connection 210 is manipulated by the accessory 106 such as by grounding the ID connection 210 to the ground connection of the plug 206 that is connected to the ground contact provided by the accessory port 204 or by providing a voltage other than ground that will trigger power from the host device 104. Providing the appropriate voltage state at the ID connection 210 then triggers the host device 104 to begin providing power to the voltage connection 208.

In some embodiments, the accessory plug 206 also includes one or more data connections 236 whose optional nature is represented by the dashed line. The data connections 236 can carry data between the host device 104 and the accessory 106, such as instructions, settings, or other data from an application of the host device 104 to the accessory 106 and/or such data from the accessory 106 to the host device 104.

Because the accessory 106 does not include a battery as a long term power source, the accessory 106 relies on power from the voltage connection 208. However, in order to avoid drawing power from the host device 104 through the voltage connection 208 at all times, the accessory 106 allows the voltage state of the ID connection 210 to float until the accessory 106 begins receiving wireless signals that are converted to electrical power by the accessory 106. One particularly convenient manner of providing such wireless signals is for the host device 104 to begin emitting wireless signals 221 via a wireless antenna 202 such as a near field communication (NFC) coil. The wireless signals 221 may be of various forms including signals that are primarily magnetic fields, primarily electric fields, or electromagnetic fields.

The accessory 106 includes a wireless antenna 220 that receives the wireless signal 221 and passes the wireless signal to a rectifier 222 where it is rectified into a rectified signal that is usable electrical power. This electrical power then allows a switch control mechanism 224 to operate an electronic switch 218. In this example, the ID connection 210 signals to the host device 106 to begin providing power upon the ID connection 210 being connected to system ground, and therefore the switch 218 transitions from an open state to a closed state and interconnects the ID connection 210 to system ground. The host device 104 begins providing power onto the voltage connection 208. As can be seen, the switch control mechanism 226 of this example relies solely on the output of the rectifier 222 in order to control the switch 218. In another example, the switch 218 may interconnect the ID connection 210 to a voltage other than a system ground, such as a specific voltage that is available from another low power connection of the accessory port of the host device, from the output of the rectifier 222, or from a low power battery of the accessory 106 itself. In yet another example, the switch 218 may interconnect the ID connection 210 to a path that includes a resistance between the ID connection 210 and ground to create a voltage divider that sets the voltage at the ID connection 210.

In this example, the accessory port of the host device 104 provides a DC voltage of approximately 5V which is typical for a USB accessory port but it will be appreciated that the voltage being supplied by the host device 104 may be other voltages besides 5V. However, the accessory 106 may include components such as a controller 226 that operates on a different voltage than that being supplied by the host device 104, such as 2.8V instead of a supplied 5V. Therefore, the voltage on the connection 208 may be provided to a voltage regulator 214, for instance a low drop-out (LDO) regulator, that outputs 2.8V onto a supply voltage node 216. The controller 226 or other component of the accessory 106 may then become active while the supply voltage is being provided by the host device 104.

The controller 226 of this example may be of various forms such as a general purpose programmable processor, an application specific circuit, hardwired digital and/or analog circuits, and the like. The controller 226 may utilize a memory 228 for volatile data storage and utilize an oscillator 230 to provide the clock cycling for the operations being performed. While the memory 228 and oscillator 230 are shown as separate components, it will be appreciated that these may alternatively may integral to the controller 226. The controller 226 of this example may also utilize other components such as a transceiver 232 that establishes the exchange of the wireless signals 114, 116 with the IMD 108 or other external device. The controller 226 may additionally or alternatively utilize on-board or external sensors 234 to collect sensor data.

Figure 2B:
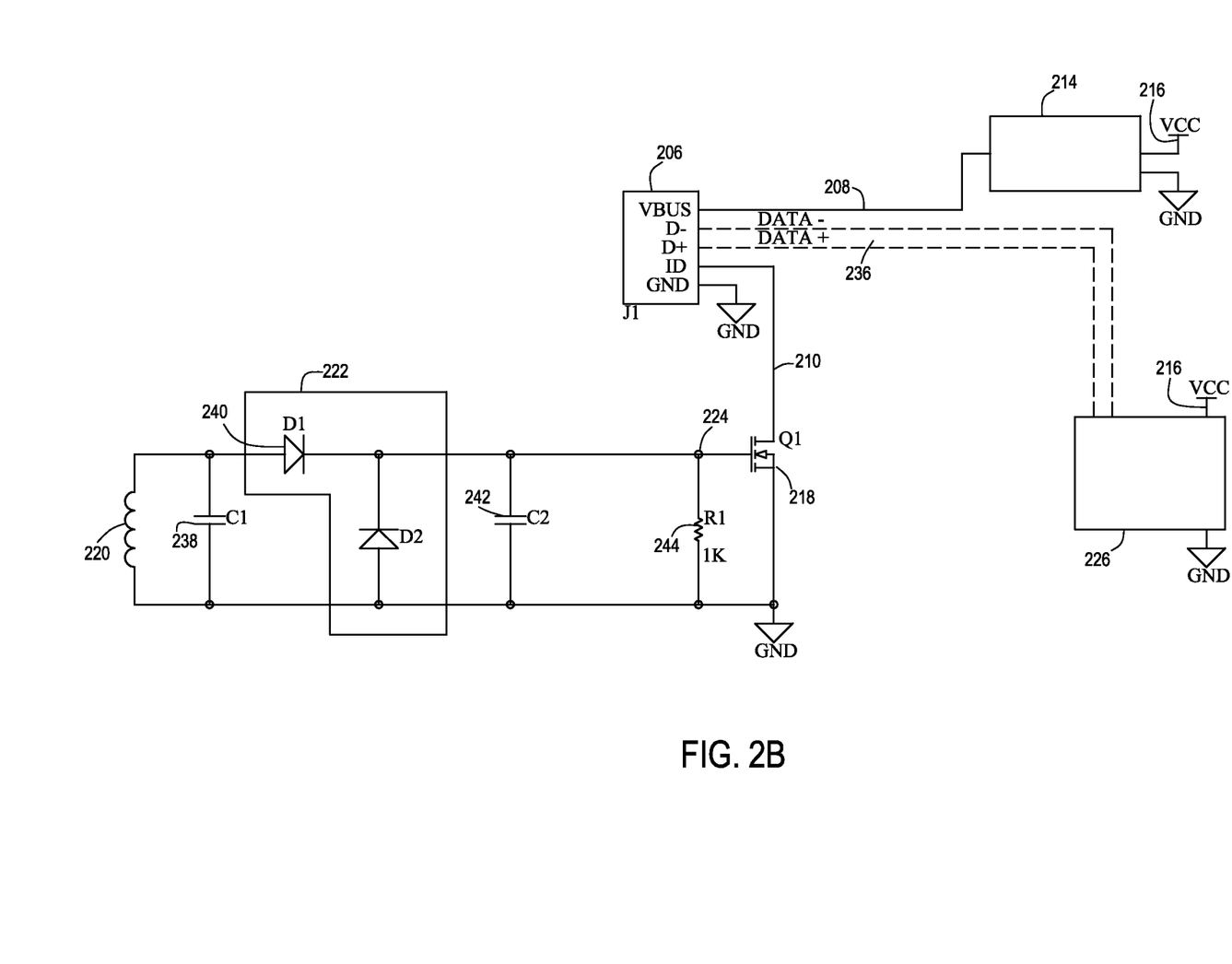
FIG. 2B shows an example of a circuit schematic for the accessory of FIG. 2A.

FIG. 2B shows the components of the accessory 106 that are used in controlling power delivery from the host device 104 in circuit schematic format. The antenna 220 in this example takes the form of a coil that is tuned to a frequency of the wireless signal 221 by a tuning capacitor 238 to optimize the conversion of the wireless signal 221 to an electrical current. The electrical current being output by the antenna 222 is of an alternating nature and therefore the rectifier 222 receives the electrical current and outputs a rectified current that is a train of pulses. The rectifier 222 may include one or more diodes 240 and may be of various configurations, such as the half-wave rectifier as shown as well as other well-known half wave or full wave rectifier configurations.

The switch control 224 takes the form of a DC voltage that results from a supply capacitor 242 that is charged by the output of the rectifier 222 and that acts as a power source for the switch control 224. A resistor 244 may also be included to establish a discharge rate of the supply capacitor 242. The switch control voltage is applied to the electronic switch 218, which in this example is an N-channel MOSFET device having the gate connected to the switch control voltage while having the drain connected to the ID connection 210 and the source connected to ground. Thus, when the wireless signal 221 is received by the antenna 220, a voltage is applied to the gate of the electronic switch 218 causing the electronic switch 218 to become conductive, i.e., transition from the open state to the closed state, thereby causing the ID connection 210 to be interconnected either directly to the ground connection or to connect the ID connection 210 so that a resistance is present between the ID connection 210 and ground to establish a voltage divider that sets a triggering voltage other than ground at the ID connection 210. The triggering voltage, whether it be ground or some other voltage that is established by a voltage divider or that is output by the rectifier 222 and fed to the ID connection 210, triggers the host device 104 to begin providing power to the voltage connection 208.

The wireless signal 221 may be present because some activity at the host device 104 causes the antenna 202 to begin emitting the wireless signal 221. For instance, the host device 104 may be configured to emit the wireless signal 221 at all times while the device is unlocked and/or at all times when the screen is on. As another example, the host device 104 may be configured to emit the wireless signal 221 under the control of an application program being implemented on the host device 104 without regard to the host device 104 being locked or the screen being off. Furthermore, in some examples the wireless signal 221 may be triggered by user activity, such as selecting a specific option of the user interface or pressing a specific button of the host device 104.

Power is being supplied from the host device 104 only when the electronic switch 218 is in the closed state in this example. Once some activity results in termination of the wireless signal 221, the accessory 106 is no longer able to maintain the electronic switch 218 in the closed position and the ID connection 210 is no longer grounded or otherwise set to a triggering voltage. The host device 104 is then triggered to stop providing power on the voltage connection 208. Activity that stops the wireless signal may include the host device 104 being locked, the screen of the host device 104 being turned off, the application program turning off the wireless signal, and so forth.

It will be appreciated that the circuit schematic of FIG. 2B is one example and other circuit elements may be included in other examples. For instance, multiple capacitors may be used to tune the antenna. Likewise, multiple capacitors and/or a Zener diode may be used to smooth the voltage from the rectifier 222 and supply power to the switch control 224. Zener diodes may also be used to protect the electronic switch 218 from voltage spikes or more constant voltage levels that are higher than intended for the switch 218, such as by creating a path for such spikes or other excess voltage from the node 224 to ground to bypass the switch 218.

Figure 5:
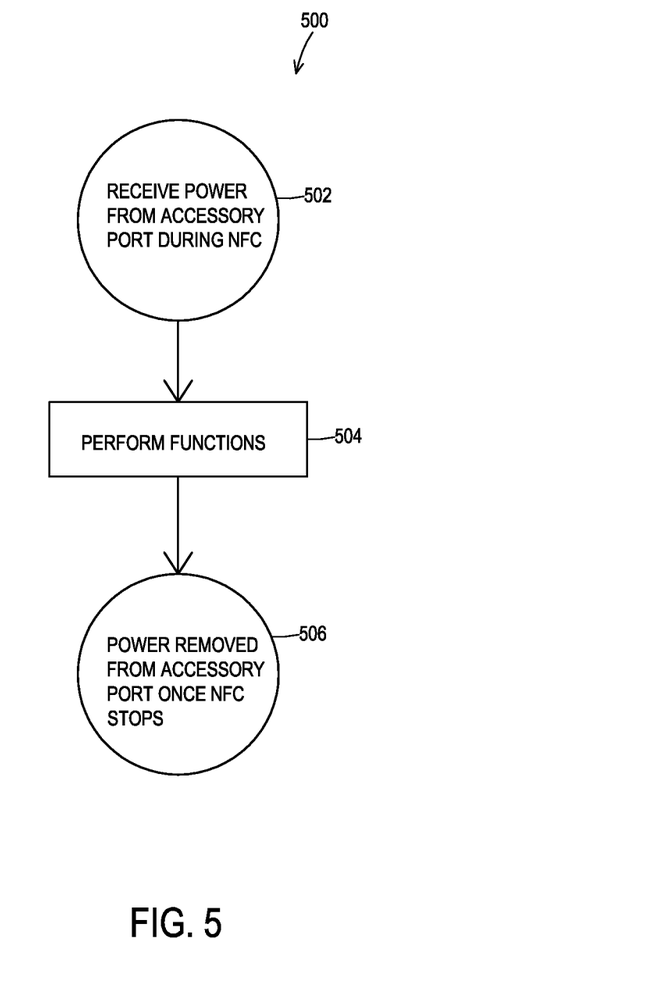
FIG. 5 shows an example of states of the wireless signal and related operations of the accessory where the accessory relies solely on received wireless signals to maintain the provisioning of power by the host device to the accessory.

FIG. 5 shows an example 500 of operations and states of the wireless signal 221 to illustrate the control of power to the accessory 106. Initially, power is received at the accessory port at a state 502 once the host device 104 begins emitting the wireless signal 221, such as when a user 112 unlocks the host device 104. At this point, the accessory 106 is receiving power and may then perform the functions that the accessory 106 is designed to perform at an operation 504. For instance, the controller 226 may communicate with the IMD 108 and with an application program being implemented by the host device 104. At some later point, power is then removed from the accessory 106 at a state 506 once the host device 104 ceases to emit the wireless signal 221, such as when a user locks the host device 104.

Figure 3A:
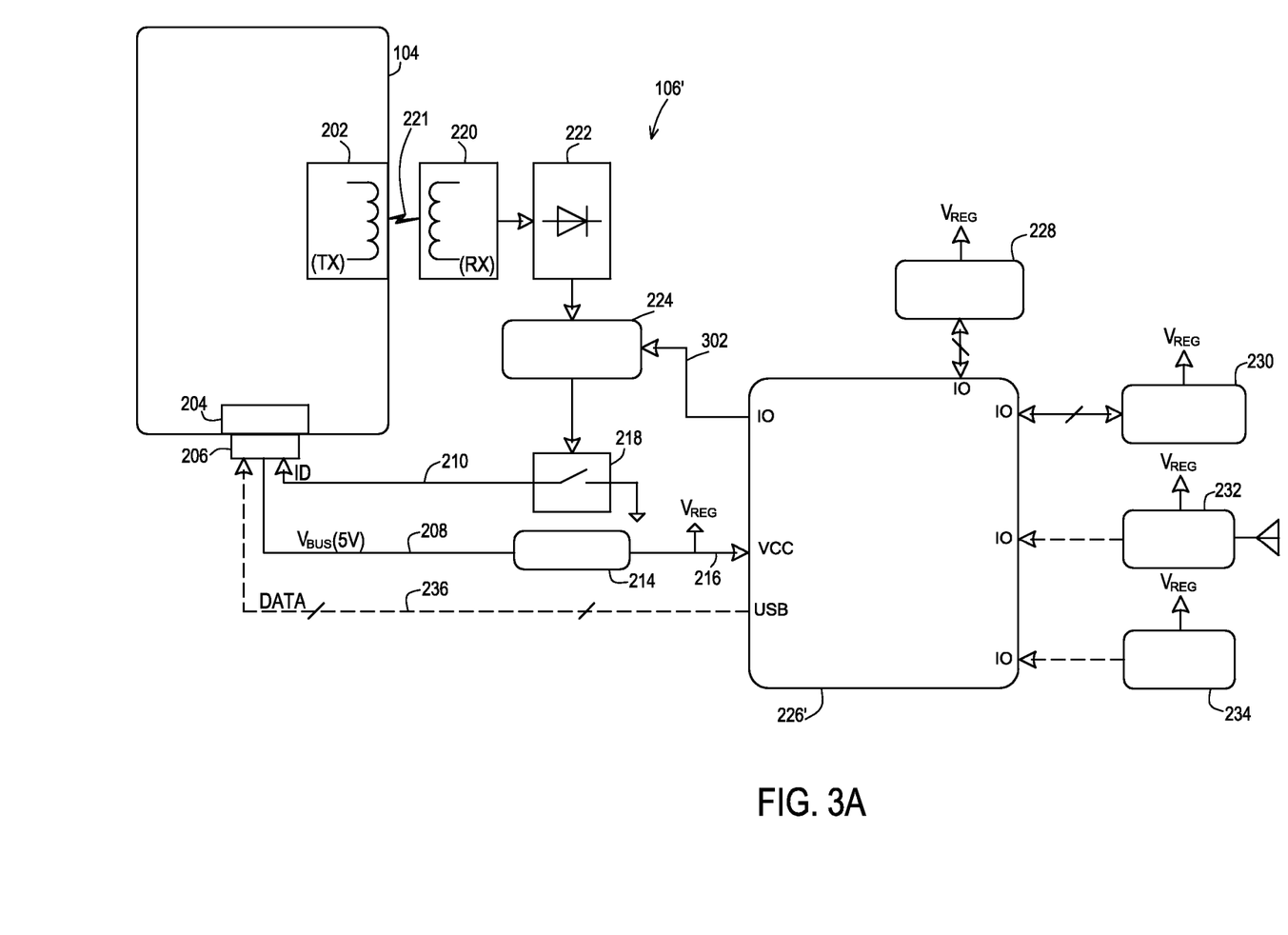
FIG. 3A shows an example of a system including a host device and an accessory that includes various components shown in block diagram form, where a controller of the accessory may maintain the provisioning of power by the host device to the accessory once wireless signals have allowed the controller to become active.

FIG. 3A shows the components of another example of an accessory 106' that are used in controlling power delivery from the host device 104 in circuit schematic format. Many of the components of the accessory 106' are the same as with the previous example shown in FIG. 2A. The difference in this example of FIG. 3A is a controller 226' of the accessory 106' has an additional electrical connection 302 to the switch control mechanism 224. This is also illustrated in the circuit schematic of FIG. 3B where the controller 226' has a connection to an electrical node that provides the switch control mechanism 224 in order to control operation of the electronic switch 218 in parallel with the output of the rectifier 222.

Figure 3B:
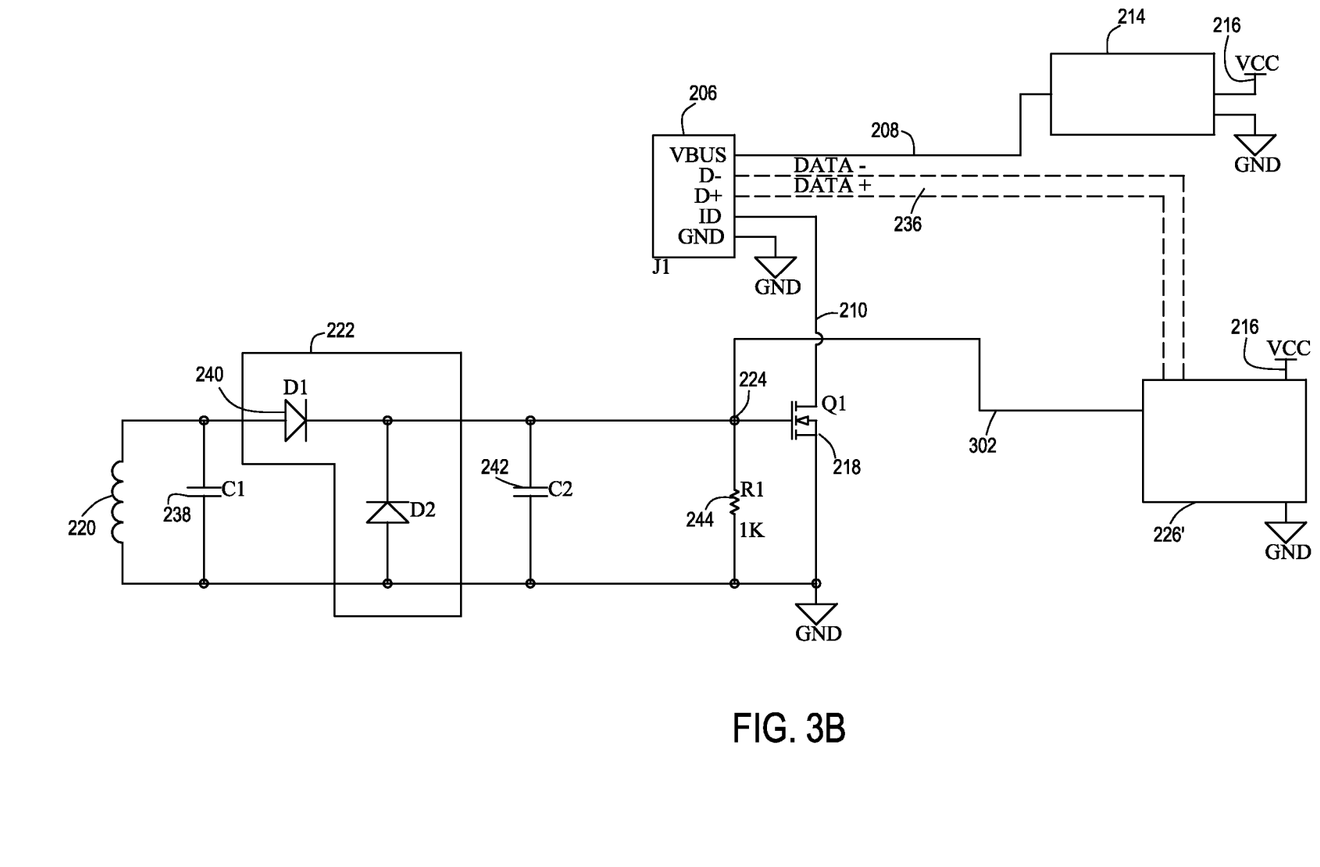
FIG. 3B shows an example of a circuit schematic for the accessory of FIG. 3A.

In the example of FIGS. 3A and 3B, the controller 226' outputs a voltage on the electrical connection 302 to provide an additional power source to a node that acts as the switch control mechanism 224. In this manner, the controller 226' is able to maintain the interconnection of the ID connection 210 to the corresponding electrical connection of the host device 104, which is the ground connection in this example, to thereby cause the host device 104 to continue providing power on the voltage connection 208 regardless of whether voltage is being output by the rectifier 222. Thus, even if the wireless signal 221 is such that the rectifier 222 is not able to continuously provide steady power to the supply capacitor 242, the controller 226' is able to maintain the electronic switch 218 in the closed position so that power from the host device 104 to the accessory 106 is maintained. Additionally, should the wireless signal 221 be stopped by the host device 104, the controller 226' may still maintain the ID connection 210 at ground by the parallel operation of the electronic switch 218. This allows the accessory 106' to be functional even when the host device 104 stops the wireless signal 221 such as when the screen is locked or tuned off. This is beneficial because this allows the accessory 106' to function as long as is necessary to complete whatever functions are desired, such as to communicate with an application program that continues to function on the host device 104 even when the host device 104 has terminated the wireless signal 221.

Where the controller 226' can control the operation of the electronic switch 218 via the connection 302 once the controller 226' has been powered on by rectification of the wireless signal 221 as in FIGS. 3A and 3B, the controller 226' is also involved in controlling when the host device 104 ceases providing power to the accessory 106'. The controller 226' may cease providing a voltage to the node acting as the switch control mechanism 224 in one of various ways. For instance, the controller 226' may utilize a timer and once the timer is expired, then stop providing the voltage on the connection 302. As another example, the controller 226' may act on an instruction by an application program being implemented by the host device 104 to turn off the voltage on the connection 302. Once both the controller 226' and the rectifier 222 stop providing the voltage to the switch control mechanism 224, the electronic switch 218 will stop conducting and have an open state (i.e., become an open switch) and the ID connection 210 will no longer be grounded or will no longer have a triggering voltage set such as by a voltage divider. As a result, the host device 104 of this example will stop providing power on the voltage connection 208.

Figure 4A:
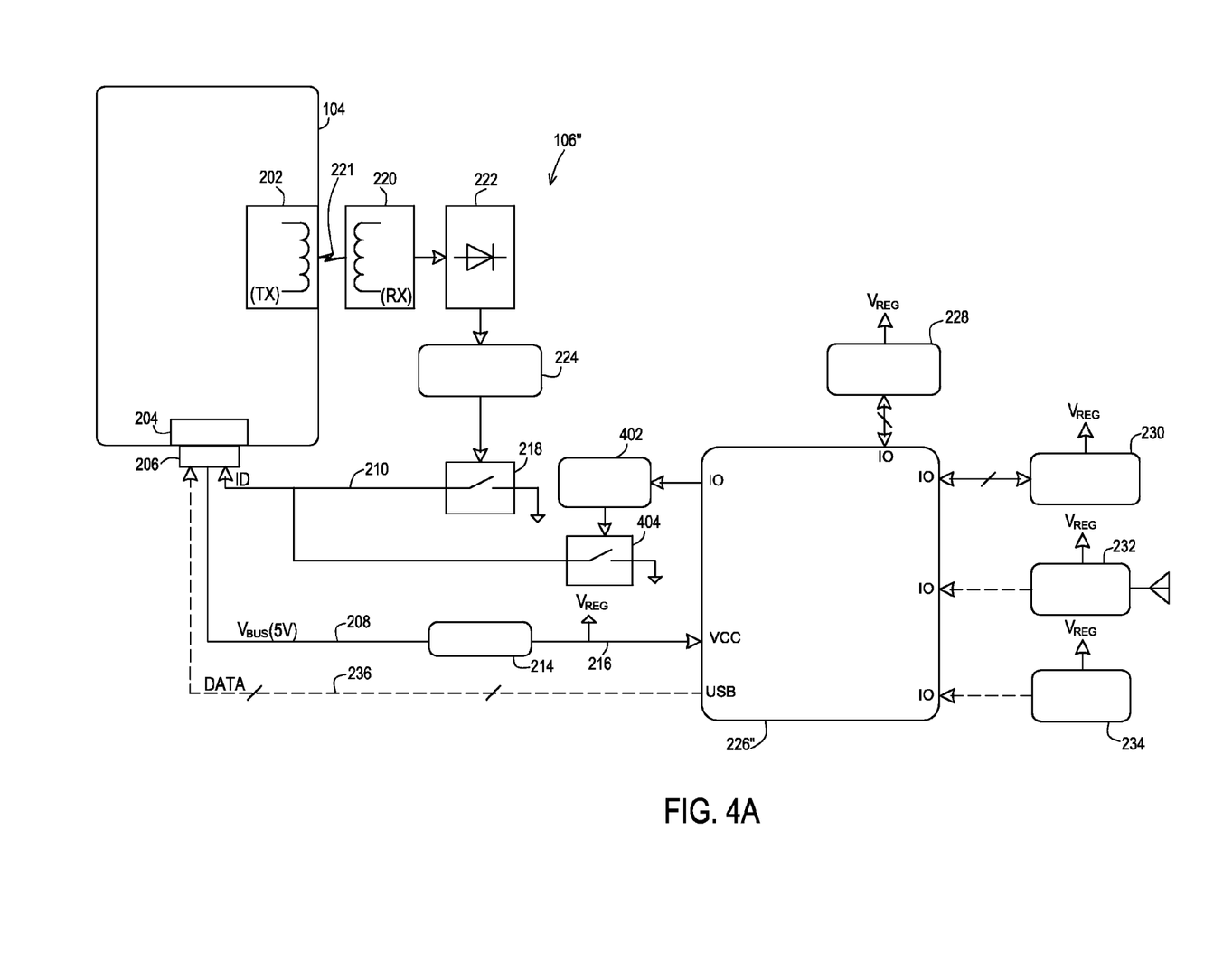
FIG. 4A shows another example of a system including a host device and an accessory that includes various components shown in block diagram form, where a controller of the accessory may maintain the provisioning of power by the host device to the accessory once wireless signals have allowed the controller to become active.

FIG. 4A shows the components of another example of an accessory 106" that are used in controlling power delivery from the host device 104 in circuit schematic format. Many of the components of the accessory 106" are the same as with the previous examples shown in FIGS. 2A and 3A. The difference in this example of FIG. 4A is a controller 226" of the accessory 106" has an additional electrical connection connected to an additional switch control mechanism 402 that controls a second electronic switch 404. This is also illustrated in the circuit schematic of FIG. 4B where the controller 226" has a connection to an electrical node that provides the second switch control mechanism 402 in order to control operation of the second electronic switch 404. The second electronic switch 404 provides a parallel path for grounding or otherwise setting a triggering voltage such as by a voltage divider at the ID connection 210. A resistor 406 is also included in the example to provide a discharge path from the node acting as the switch control mechanism 402 to ground.

Figure 4B:
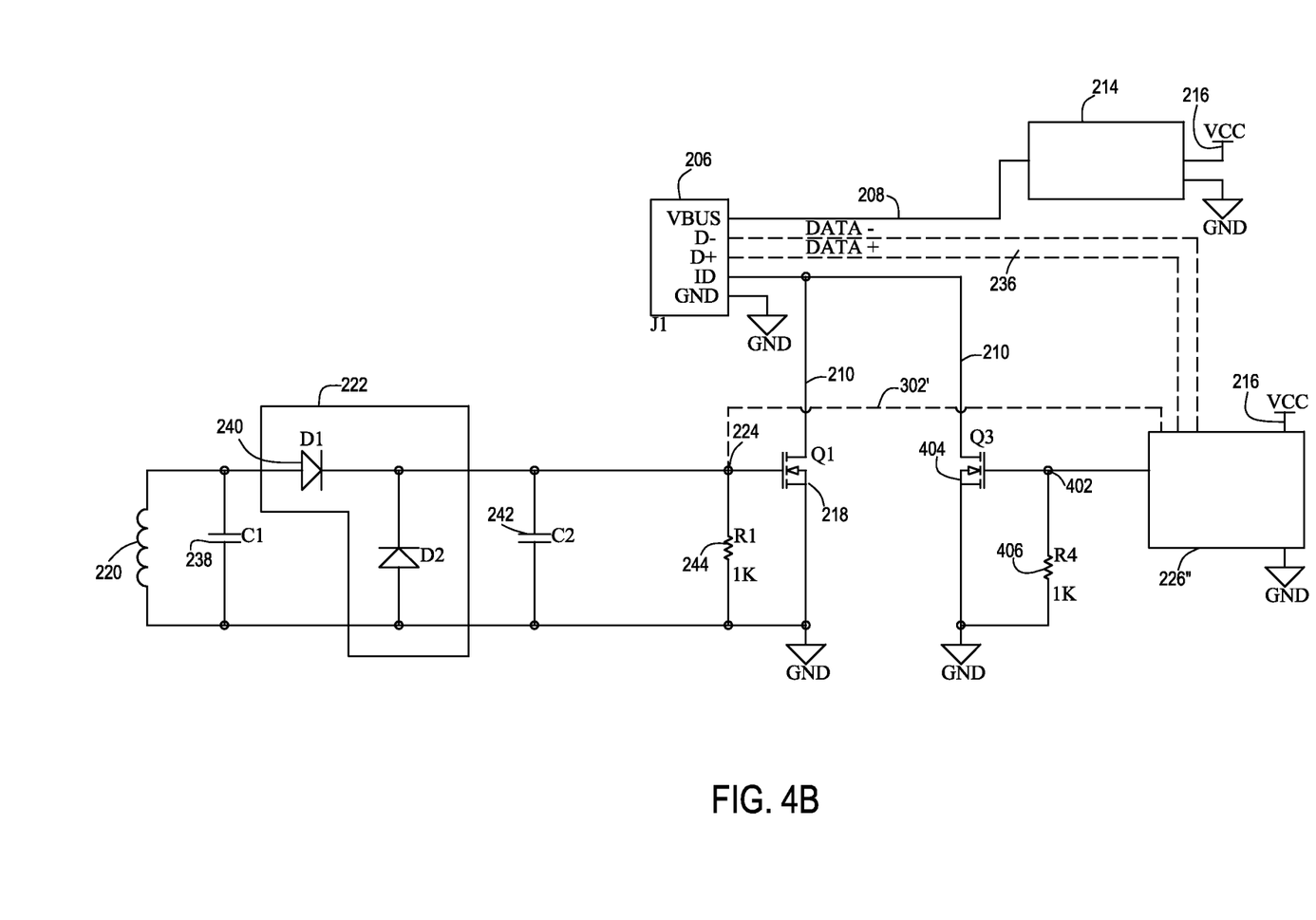
FIG. 4B shows an example of a circuit schematic for the accessory of FIG. 4A.

In the example of FIGS. 4A and 4B, the controller 226" provides a voltage to the node that acts as the switch control mechanism 402. In this manner, the controller 226" is able to maintain the interconnection of the ID connection 210 to the corresponding electrical connection of the host device 104 to thereby cause the host device 104 to continue providing power on the voltage connection 208 regardless of whether voltage is being output by the rectifier 222. Thus, even if the wireless signal 221 is such that the rectifier 222 is not able to continuously provide steady power to the supply capacitor 242, the controller 226" is able to maintain the second electronic switch 404 in the closed position so that power from the host device 104 to the accessory 106" is maintained. Additionally, should the wireless signal 221 be stopped by the host device 104, the controller 226" may still maintain the ID connection 210 at ground, or at another voltage that triggers the host to provide power such as via a voltage divider, by operation of the second electronic switch 404. As discussed above in relation to FIGS. 3A and 3B, this allows the accessory 106" to be functional even when the host device 104 stops the wireless signal 221 such as when the screen is locked or tuned off. As also discussed above in relation to the prior example, this is beneficial because this allows the accessory 106" to function as long as is necessary to complete whatever functions are desired, such as to communicate with an application program that continues to function on the host device 104 even when the host device 104 has terminated the wireless signal 221.

Where the controller 226" can control the operation of the second electronic switch 404 via the voltage on the node 402 once the controller 226" has been powered on by rectification of the wireless signal 221 as in FIGS. 4A and 4B, the controller 226" is also involved in controlling when the host device 104 ceases providing power to the accessory 106". The controller 226" of this example may also cease providing a voltage to the node acting as the switch control mechanism 402 in various ways. For instance, the controller 226" of this example may also utilize a timer and once the timer is expired, then stop providing the voltage to the node 404. As another example, the controller 226" of this example may also act on an instruction by an application being implemented by the host device 104 to turn off the voltage being provided to the node 404. As yet another example, the controller 226" may have a connection 302' to the output of the rectifier 222 in order to sample the voltage being provided by the rectifier 222 such that once the voltage being provided by the rectifier 222 remains below a threshold for a given amount of time, then the controller 226" turns off the voltage to the node acting as the second switch control mechanism 402. Once the controller 226" has stopped providing voltage to the second switch control mechanism 402 and the rectifier 222 has stopped providing the voltage to the first switch control mechanism 224, meaning both the first electronic switch 218 and the second electronic switch 404 have stopped conducting (i.e., have become open switches), the ID connection 210 will no longer be grounded. As a result, the host device 104 will stop providing power on the voltage connection 208.

Figure 6:
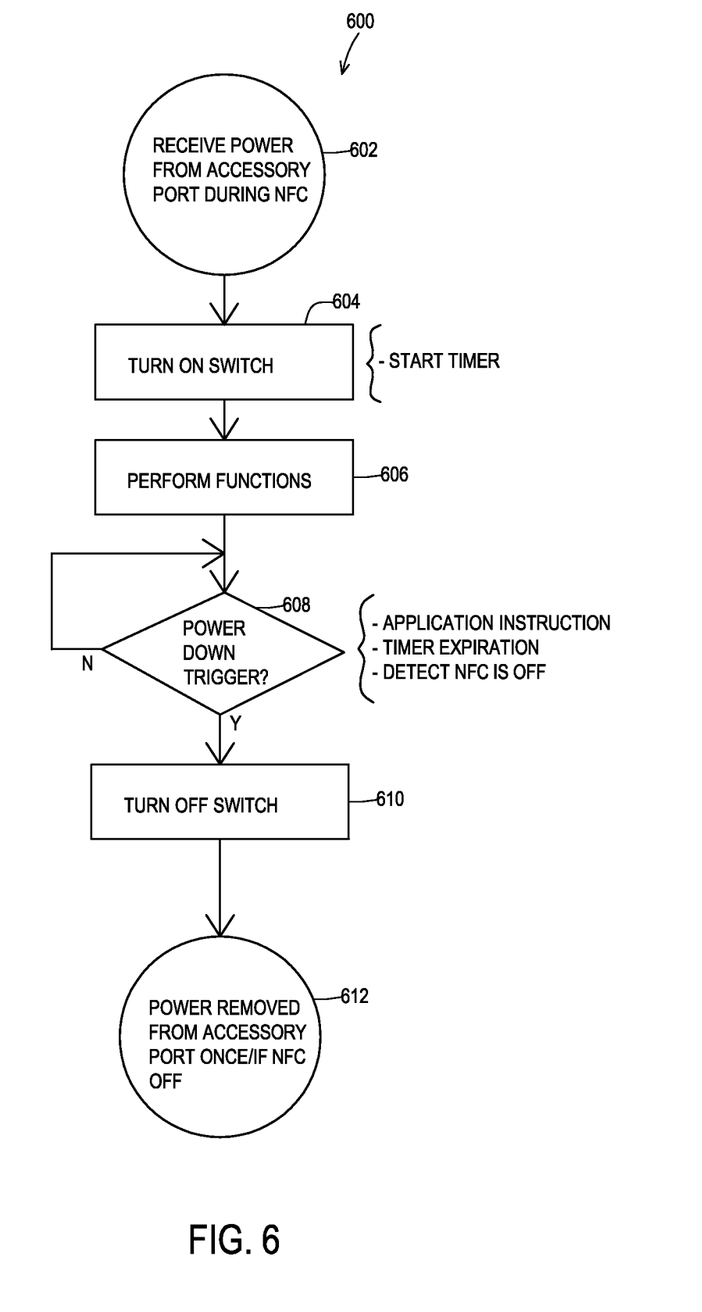
FIG. 6 shows an example of states of the wireless signal and related operations of the accessory where a controller of the accessory may maintain the provisioning of power by the host device to the accessory once wireless signals have allowed the controller to become active.

FIG. 6 shows another example 600 of operations and states of the wireless signal 221 to illustrate the control of power to the accessory 106' or 106". Initially, power is received at the accessory port at a state 602 once the wireless signal 221 is present, such as when a user 112 unlocks the host device 104. At this point, the accessory 106' or 106" is receiving power because the ID connection 210 has been grounded, or some other voltage has been set on the ID connection 210 such as via a voltage divider, to trigger the host device 104 to provide the power. In the case of the example of FIGS. 3A and 3B, the controller 226' which has become active may then also begin to maintain the first switch 218 in the closed position at an operation 604. In the case of the example of FIGS. 4A and 4B, the controller 226" which has become active may close the second switch 404 at the operation 604. This operation 604 ensures that steady power from the host device 104 will be maintained even if the first switch 218 opens briefly or for a sustained period. Where a timer is used to determine when to open the second switch 404, the controller 226' or 226" may start the timer. The accessory 106' or 106" may then perform the functions that the accessory 106' or 106" is designed to perform at an operation 606. For instance, the controller 226' or 226" may communicate with the IMD 108 and with an application program being implemented by the host device 104.

After completing those functions, the controller 226' or 226" may begin to detect whether a power down trigger has occurred at a query operation 608. For instance, the controller 226' or 226" may determine if the application at the host device 104 has requested the accessory 106' or 106" to power down. As another example, the controller 226' or 226" may determine whether the timer has expired. As yet another example the controller 226" may further determine whether the rectifier 222 has stopped providing a voltage over a threshold for a given amount of time. Once the power down trigger has been detected by the controller 226' or 226", the controller 226' stops providing voltage to the first switch control mechanism 224 to attempt to turn off the first electronic switch 218 or the controller 226" stops providing voltage to the second switch control mechanism 402 to turn off the second electronic switch 404. Once both the rectifier 222 and the controller 226' or 226' has stopped providing voltage to maintain the electronic switch 218, and the electronic switch 404 in the case of controller 226", then the host device 104 stops providing power to the accessory 106' or 106".

From the discussion above, it can be seen that the accessory 106, 106', or 106" may remain permanently attached to the host device 104 but only draw power from the host device 104 during certain periods of time. Therefore, the battery life of the host device 104 is better preserved while also allowing for the accessory 106, 106', or 106" to begin receiving power and awaken to perform desired functions when needed.

While embodiments have been particularly shown and described, it will be understood by those skilled in the art that various other changes in the form and details may be made therein without departing from the spirit and scope of the invention.

What is claimed is:

1. A method of triggering a host device with an accessory port to provide power to an accessory coupled to the accessory port, comprising:
   receiving a wireless signal provided by the host device at the accessory while the accessory is not being powered with the accessory port by the host device;
   rectifying the wireless signal into a rectified signal at the accessory;
   charging a power source of the accessory with the rectified signal;
   using power from the power source, manipulating by the accessory a voltage state of a first electrical connection at the accessory port to trigger the host device to begin providing power via a second electrical connection.

2. The method of claim 1, wherein manipulating by the accessory a voltage state of the first electrical connection comprises providing a voltage from the power source to a first electronic switch to electrically interconnect the first electrical connection to a ground electrical connection at the accessory port by operation of the first electronic switch.

3. The method of claim 2, further comprising powering on a controller from the second electrical connection once the first electrical connection is interconnected to the ground electrical connection.

4. The method of claim 3, further comprising providing a voltage from the controller to the first electronic switch, once the controller is powered on by the second electrical connection, to maintain the electrical interconnection between the first electrical connection and the ground electrical connection.

5. The method of claim 4, further comprising receiving an instruction at the accessory to power off via a data connection at the accessory port and then ceasing the maintaining of the interconnection of the first electrical connection to the ground electrical connection.

6. The method of claim 4, further comprising starting a timer at the accessory after the host begins to provide power to the accessory and upon expiration of the timer, then ceasing the maintaining of the interconnection of the first electrical connection to the ground electrical connection.

7. The method of claim 3, further comprising providing a voltage from the controller to a second electronic switch, once the controller is powered on by the second electrical connection, to interconnect the first electrical connection and the ground electrical connection by operation of the second electronic switch.

8. The method of claim 7, further comprising monitoring by the controller for the presence of the voltage from the power source and when the voltage from the power source is below a threshold, then ceasing to provide the voltage to the second electronic switch.

9. The method of claim 3, wherein the accessory port is a universal serial bus with an on-the-go feature.

10. A method of triggering a host device with an accessory port to provide power to an accessory coupled to the accessory port, comprising:
providing a first electronic switch of the accessory in a first state such that the accessory is not being powered by the host device;
upon the first electronic switch changing to a second state, manipulating by the accessory a voltage on a first electrical connection at the accessory port to trigger the host device to begin providing power via a second electrical connection; and
powering on a controller of the accessory from a second electrical connection at the accessory port once the first electrical connection is interconnected to a ground electrical connection at the accessory port.

11. The method of claim 10, further comprising:
receiving a wireless signal at the accessory while the accessory is not being powered by the host device and while the first electronic switch is in the first state;
rectifying the wireless signal into a rectified signal at the accessory;
charging a power source of the accessory with the rectified signal; and
using power from the power source, changing the first electronic switch to the second state.

12. The method of claim 11, wherein the first electronic switch electrically interconnects the first electrical connection to a ground electrical connection at the accessory port when in the second state.

13. The method of claim 11, wherein receiving the wireless signal comprises receiving the wireless signal that is being provided by the host device.

14. The method of claim 10, further comprising providing a voltage from the controller to the first electronic switch, once the controller is powered on by the second electrical connection, to maintain the electrical interconnection between the first electrical connection and the ground electrical connection.

15. The method of claim 10, further comprising providing a voltage from the controller to a second electronic switch, once the controller is powered on by the second electrical connection, to interconnect the first electrical connection and the ground electrical connection by operation of the second electronic switch.

16. The method of claim 10, wherein the accessory port is a universal serial bus with an on-the-go feature.

17. An accessory that triggers a host device with an accessory port to provide power to the accessory when coupled to the accessory port, comprising:
an antenna that receives a wireless signal provided by the host device;
a rectifier that rectifies the wireless signals into a rectified signal;
a power source that is charged by the rectified signal;
a first electrical connection that controls whether the host device provides power to the accessory;
a triggering electrical connection; and
a first electronic switch coupled to the power source, to the first electrical connection, and to the ground electrical connection, such that upon the power source being charged and providing a voltage to the electronic switch, the electronic switch electrically interconnects the first electrical connection to the triggering electrical connection to trigger the host device to begin providing power to the accessory.

18. The accessory of claim 17, further comprising:
a controller;
a second electrical connection that receives power through the accessory port when the first electrical connection is interconnected to the triggering electrical connection and that provides power to the controller.

19. The accessory of claim 18, wherein the controller provides a voltage to the first electronic switch, once the controller is powered on by the second electrical connection, to maintain the electrical interconnection between the first electrical connection and the triggering electrical connection.

20. The accessory of claim 18, further comprising a second electronic switch coupled to the controller, to the first electrical connection, and to the ground electrical connection, such that upon the controller provides a voltage to the second electronic switch once the controller is powered on by the second electrical connection to maintain the electrical interconnection between the first electrical connection and the triggering electrical connection.

21. The accessory of claim 17, wherein the triggering electrical connection is a ground connection.

22. A system, comprising:
an electronic host device that includes an accessory port having a first electrical contact, a second electrical contact, and a triggering electrical contact;
an accessory that comprises:
a plug having a first electrical connection, a second electrical connection, and a triggering electrical connection, the first electrical connection being electrically coupled to the first electrical contact, the second electrical connection being electrically coupled to the second electrical contact, and the triggering electrical connection being electrically coupled to the triggering electrical contact;
an antenna that receives a wireless signal;
a rectifier that rectifies the wireless signals into a rectified signal;
a power source that is charged by the rectified signal;
a first electronic switch coupled to the power source, to the first electrical connection, and to the triggering electrical connection, such that upon the power source being charged and providing a voltage to the electronic switch, the electronic switch electrically interconnects the first electrical connection to the triggering electrical connection to trigger the electronic host device to begin providing power to the accessory via the second electrical connection.

23. The system of claim 22, wherein the accessory further comprises a controller that receives power from the second electrical connection.

24. The system of claim 23, wherein the controller provides a voltage to the first electronic switch, once the controller is powered on by the second electrical connection, to maintain the electrical interconnection between the first electrical connection and the triggering electrical connection.

25. The system of claim 23, wherein the accessory further comprises a second electronic switch coupled to the controller, to the first electrical connection, and to the triggering electrical connection, such that the controller provides a voltage to the second electronic switch once the controller is powered on by the second electrical connection to maintain the electrical interconnection between the first electrical connection and the triggering electrical connection.

26. The system of claim 22, wherein the triggering electrical contact is a ground contact.

* * * * *